Nov. 30, 1948.     A. J. ROTH     2,455,140
AUTOMOBILE TOWING DEVICE
Filed May 26, 1945
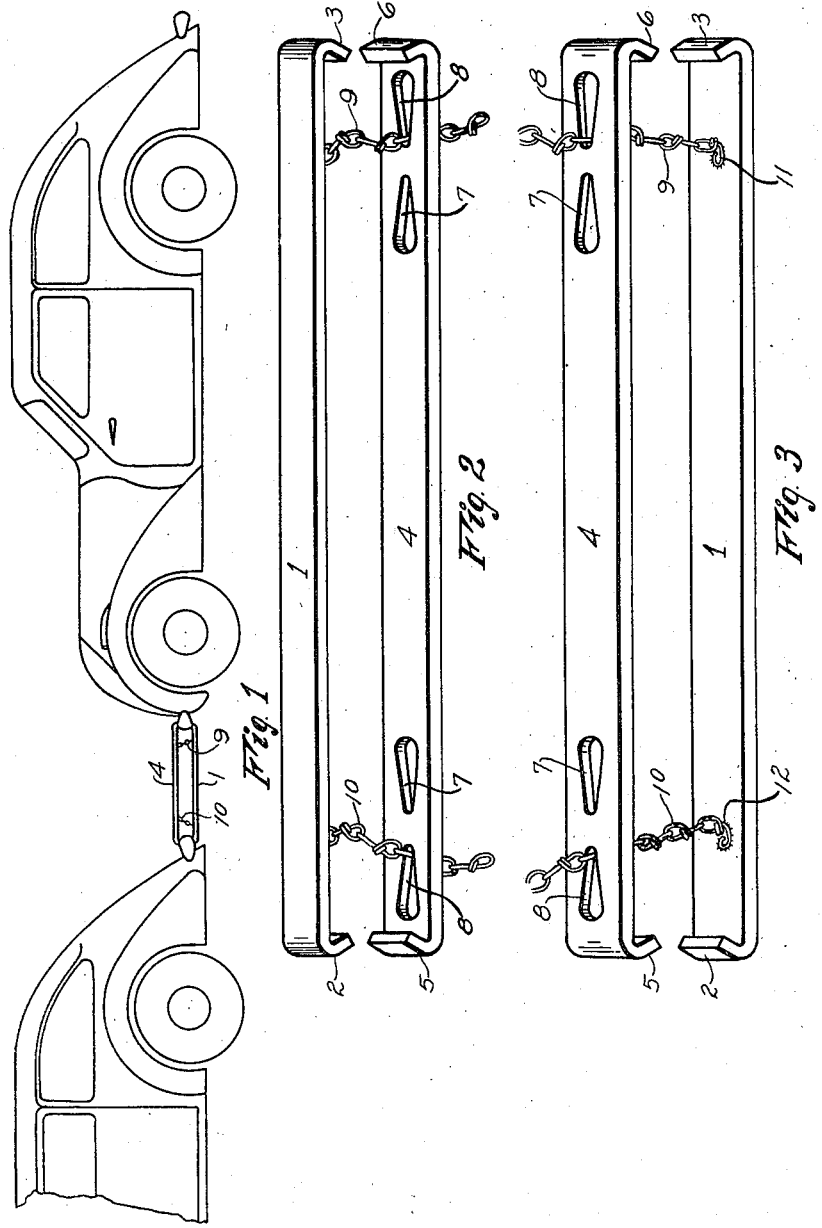
INVENTOR.
ARTHUR J. ROTH
BY
ATTORNEY Patented Nov. 30, 1948

2,455,140

UNITED STATES PATENT OFFICE 2,455,140

AUTOMOBILE TOWING DEVICE

Arthur J. Roth, Detroit, Mich.

Application May 26, 1945, Serial No. 596,028

3 Claims. (Cl. 280—33.14)

This invention relates to automobile towing devices, the object being to provide a simple and inexpensive arrangement of bars in parallel relation and having the respective end portions inturned to engage the upper and lower edges of the forward and rear bumpers of the respective cars and means for securing the same in locked relation when in position.

These and other features and objects of the invention are hereinafter more fully described and claimed and shown in the preferred form in the accompanying drawing in which—

Fig. 1 shows the device in use between a leading and a trailing car.

Fig. 2 is a perspective view showing in detail the manner of securing the bars together.

Fig. 3 is a similar view showing the parts in the reverse direction.

In its preferred form the device comprises two bars 1 and 4 each formed of a flat strip of metal. The bar 1 has end portions 2 and 3 inturned preferably at an angle less than a right angle to the body of the bar and the bar 4 is of like form and has inbent end portions 5 and 6 and the bars are alike in respect to length. The terminal end of the inbent portion is in line contact with the inner surface of the bumper and serves as a pivot point as the towing and towed car vary in position in a vertical plane. The upper bar 4 has two apertures at each end indicated at 7 and 8 which are tapered in form and positioned with the narrow ends in opposed relation. To the bar 1 is secured the link chain 9 at one end and a similar chain 10 at the opposite end.

These chains extend through respective apertures 8 of the upper bar and may be grasped by the hand of the user and, with the chains extending through the larger end of the respective apertures, the bar 1 may be brought to engagement with the bar 4 and then moved into the narrow portion of the opening to thereby secure the bars in clamping relationship with the respective bumpers of the two cars as indicated in Fig. 1.

It is to be noted that the bumper on each car is positioned between the respective chain elements and the inturned ends of the bars. If for any reason the trailing car tends to run toward the draft car, as for instance when the draft car lessens speed or is stopped, the bumper of the trailing car may move forwardly of the position shown in Fig. 1 only to such degree as is permitted by the chain 9 and this movement will force the chain 10 into contact with the bumper of the leading car. Thus the ends of the bars are prevented from contacting the rear end of the forward car or the forward end of the rear car.

In securing the device in operative position the two cars are moved to approximately the required distance apart and the bar 1 is placed on the under side of the respective bumpers and the chains may then be pulled upwardly to engage the under side of the bumpers. The chains are then turned inwardly of the apertures 8 or outwardly of the apertures 7 of the upper bar, as the case may be, so that the narrow portion of a link of the chain lies in the slot with the large end of the link projecting above the slot which cannot pass through the narrow end of the slot and thereby locks the bars in place.

The point of attachment of the ends of the chains 10 and 11 to the bar 1 are a less distance apart than the inner ends of the respective apertures 8 in the bar 2 and a greater distance apart than the narrow end of the apertures 7. The ends 11 and 12 of the respective chains extend at an angle less than a right angle to the bar 1 to which they are attached and thus at all times a link thereof tends to draw into the narrow end of the slots 7 or 8 in the bar 4 to maintain the bars in locked relation. To release the bars the chains are manually moved into the large end of the slot through which they may slide and thus permit a quick removal of the parts.

It is believed obvious from the foregoing that the automobile tow according to my invention is quite inexpensive in construction and well adapted for the purpose intended and that the various features and objects of the invention are attained by the structural form and arrangement of parts as hereinbefore described.

Having thus briefly described my invention, its utility and mode of operation, what I claim and desire to secure by Letters Patent of the United States is:

1. An automobile towing device comprising a pair of sheet metal bars of equal length and required thickness, each of the bars having their respective ends extending at an angle less than a right angle to the plane of the respective bars and positionable to engage the upper and lower edges of the rear bumper of the towing car at one end and the forward bumper of the towed car at the opposite end, one of the bars having a V-shaped aperture adjacent each of its opposite ends, and the other bar having a pair of chains attached in longitudinally spaced relation to the lower bar of the pair, the point of attachment of the chains to the lower bar being a less distance apart than the opposed ends of the apertures of the upper bar whereby the strain on the chains tends to draw the same into the narrow portion of the respective opening of the other bar thereby automatically maintaining the bars in pressure contact with the respective bumper.

2. An automobile towing device comprising a pair of bars of equal length and non-flexible material, each of the bars having the respective ends extending at an angle to the plane of the respective bar and respectively adapted to be positioned to engage the upper and lower edges of the rear bumper of the towing car at one end and the forward bumper of the towed car at the opposite end, one of the bars having a V-shaped opening at each of its opposite ends, a pair of chains each attached to the other bar at a point of such distance from the end of the bar relative to the respective openings in the first bar as to cause the chains to draw into the narrow portion of the respective opening, said chains further providing a means for drawing the lower bar to engagement with the lower edge of the respective bumpers and, by drawing the chains into the narrow portion of the opening, maintaining the chains under tension in the narrow end of the respective V opening, the links of the chains having a narrow portion between the ends thereof engaging in the small end of the respective opening whereby slippage of the chains in the slots is prevented.

3. An automobile towing device comprising a pair of metal bars of rectangular form in cross section, each of the bars having the respective ends thereof extending at an angle less than a right angle to the plane of the respective bar, the said bars being positionable to engage over the upper and lower edges of the rear bumper of the towing car at one end and the forward bumper of the towed car at the opposite end, one of the bars having a V-shaped aperture in spaced relation with the end thereof, a link chain attached to the other bar adjacent each end thereof, the point of attachment of the chain being at a greater distance from the end of the bar than the inner end of the respective aperture of the other bar whereby the chains are maintained in their respective apertures by the tension on the chain and maintaining the bars in pressure contact with the respective bumpers.

ARTHUR J. ROTH.

REFERENCES CITED

The following references are of record in the file of this patent:

UNITED STATES PATENTS

| Number | Name | Date |
|---|---|---|
| 2,150,999 | Wight | Mar. 21, 1939 |